(12) United States Patent
McGrath (10) Patent No.: US 9,936,001 B2
(45) Date of Patent: Apr. 3, 2018

(54) GEOGRAPHIC PLACEMENT OF APPLICATION COMPONENTS BY A MULTI-TENANT PLATFORM-AS-A-SERVICE (PAAS) SYSTEM

(71) Applicant: Red Hat, Inc., Raleigh, NC (US)

(72) Inventor: Michael McGrath, Schaumburg, IL (US)

(73) Assignee: RED HAT, INC., Raleigh, NC (US)

(*) Notice: Subject to any disclaimer, the term of this patent is extended or adjusted under 35 U.S.C. 154(b) by 45 days.

(21) Appl. No.: 14/181,021

(22) Filed: Feb. 14, 2014

(65) Prior Publication Data

US 2015/0237114 A1    Aug. 20, 2015

(51) Int. Cl.
   *G06F 15/173*    (2006.01)
   *H04L 29/08*    (2006.01)
   *H04L 29/06*    (2006.01)
   *G06F 9/50*    (2006.01)

(52) U.S. Cl.
   CPC ............ *H04L 67/10* (2013.01); *G06F 9/5072* (2013.01); *H04L 67/42* (2013.01); *G06F 2209/502* (2013.01)

(58) Field of Classification Search
   CPC ................................ H04L 67/10; H04L 67/42
   USPC ................... 709/201, 221, 230, 226
   See application file for complete search history.

(56) References Cited

U.S. PATENT DOCUMENTS

| | | | |
|---|---|---|---|
| 6,990,660 B2 * | 1/2006 | Moshir et al. | 717/171 |
| 8,200,240 B1 * | 6/2012 | Qu et al. | 455/456.1 |
| 9,110,976 B2 * | 8/2015 | Bolgert et al. | |
| 2003/0004743 A1 * | 1/2003 | Callegari | 705/1 |
| 2004/0143830 A1 * | 7/2004 | Gupton et al. | 717/174 |
| 2004/0255291 A1 * | 12/2004 | Sierer et al. | 717/174 |
| 2005/0091310 A1 * | 4/2005 | Salomon | 709/203 |
| 2005/0204151 A1 * | 9/2005 | Fang et al. | 713/188 |
| 2006/0223503 A1 * | 10/2006 | Muhonen et al. | 455/414.1 |
| 2007/0270132 A1 * | 11/2007 | Poosala | 455/414.2 |
| 2008/0070550 A1 * | 3/2008 | Hose | H04L 63/10 455/411 |
| 2010/0075638 A1 * | 3/2010 | Carlson | H04L 12/5855 455/412.1 |
| 2010/0105373 A1 * | 4/2010 | Kanade | 455/418 |
| 2011/0115915 A1 * | 5/2011 | Velusamy | G01S 5/0009 348/158 |

(Continued)

*Primary Examiner* — Michael Y Won
(74) *Attorney, Agent, or Firm* — Womble Bond Dickinson (US) LLP (57) ABSTRACT

Implementations for geographic placement of application components by a multi-tenant Platform-as-a-Service (PaaS) system are disclosed. A method of the disclosure includes providing, by a processing device of a multi-tenant PaaS system, a list of geographic locations to a user of a multi-tenant PaaS system, receiving, by the processing device from the user, a first request to deploy a component of an application corresponding to the user, the first request comprising a selection of one of the geographic locations from the list, and communicating, by the processing device, a second request to deploy the component of the application, the second request directed to a messaging server dedicated to the selected geographic location of the user, the dedicated messaging server of the selected geographic location to handle a configuration of a node in the selected geographic location for the component of the application.

17 Claims, 6 Drawing Sheets

(56) References Cited

U.S. PATENT DOCUMENTS

| | | | |
|---|---|---|---|
| 2011/0119381 A1* | 5/2011 | Glover | G06F 9/5072 709/226 |
| 2012/0102355 A1* | 4/2012 | Krishnaprasad et al. | 714/4.11 |
| 2012/0198073 A1* | 8/2012 | Srikanth et al. | 709/226 |
| 2012/0218889 A1* | 8/2012 | Watfa et al. | 370/230 |
| 2013/0080483 A1* | 3/2013 | Richards et al. | 707/803 |
| 2013/0198740 A1* | 8/2013 | Arroyo | H04L 41/0806 718/1 |
| 2013/0268357 A1* | 10/2013 | Heath | 705/14.53 |
| 2013/0317887 A1* | 11/2013 | Rhodes | 705/7.32 |
| 2013/0346537 A1* | 12/2013 | Fitzpatrick et al. | 709/213 |
| 2014/0244329 A1* | 8/2014 | Urban | G06Q 10/063114 705/7.15 |
| 2014/0368601 A1* | 12/2014 | deCharms | 348/14.02 |
| 2014/0379871 A1* | 12/2014 | Van Brandenburg et al. | 709/219 |
| 2015/0067171 A1* | 3/2015 | Yum | H04L 67/2809 709/226 |
| 2015/0089001 A1* | 3/2015 | Mordani et al. | 709/206 |
| 2015/0120849 A1* | 4/2015 | Thies | H04W 72/0493 709/206 |
| 2015/0150129 A1* | 5/2015 | Giura | H04L 63/1441 726/23 |
| 2015/0237114 A1* | 8/2015 | McGrath | 709/201 |
| 2015/0261768 A1* | 9/2015 | Ahn | G06F 17/30085 707/665 |
| 2016/0241633 A1* | 8/2016 | Overby, Jr. | H04L 63/20 |

* cited by examiner

```
Identify distinct location for hosting of a multi-tenant PaaS platform node, the
location one of multiple geographic locations managed by the multi-tenant PaaS
                                                                            410

Install multi-tenant PaaS platform on one or more nodes of the identified location
                                                                            420

Configure broker of multi-tenant PaaS with information regarding the identified
location and the one or more nodes with the installed multi-tenant PaaS platform
                              at the identified location
                                                                            430

Configure users or groups of users of the multi-tenant PaaS that have access to
                    the one or more nodes of the identified location
                                                                            440

Configure default location of the multiple geographic locations to apply to users of
                              the multi-tenant PaaS
                                                                            450
```

Provide list of available geographic locations for selection by a user of a multi-tenant PaaS via client tools of the multi-tenant PaaS
510

Receive request with geographic location parameter from the user, the geographic location selected by the user via the provided list of available geographic locations
520

Create application deployment request for application according to the user's request, the application deployment request including a flag indicating the geographic location parameter
530

Communicate request to messaging server in the selected geographic region
540

Receive response from a node of the selected geographic region confirming success of the application deployment request
550

Provide success response to the user and exit
560

GEOGRAPHIC PLACEMENT OF APPLICATION COMPONENTS BY A MULTI-TENANT PLATFORM-AS-A-SERVICE (PAAS) SYSTEM

TECHNICAL FIELD

The implementations of the disclosure relate generally to computing infrastructures and, more specifically, relate to geographic placement of application components by a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for geographic placement of application components by a multi-tenant Platform-as-a-Service (PaaS) system. In one implementation, a broker server of a PaaS system utilizes a geographic component to manage placement of nodes (e.g., VMs) to host deployed applications of the PaaS over several distinct geographies. A user of the PaaS may specifically request placement of a deployed (or deploying) application in a particular geography provided by the PaaS. The geographies may be different countries, regions, states, cities, datacenters, and so on.

The broker server may communicate with multiple messaging servers. There may be at least one dedicated messaging server for each geographic region managed by the PaaS. The dedicated messaging server for a geographic region coordinates the deployment of the application components onto the nodes of the messaging server's particular geographic region.

Previous implementations of PaaS systems did not provide a direct way to manage geographic placement of application deployments for user. In some cases, disparate and discrete installations of the PaaS were deployed at various locations in order to provide a geographic deployment solution for users of the PaaS system. These distinct installations of the PaaS could not easily communicate with each other and, as such, provided a bulky and difficult option for users. Implementations of the disclosure overcome the drawbacks of prior solutions by providing a connected solution for deploying application components to user-selectable geographic regions of a single multi-tenant PaaS installation.

Figure 1:
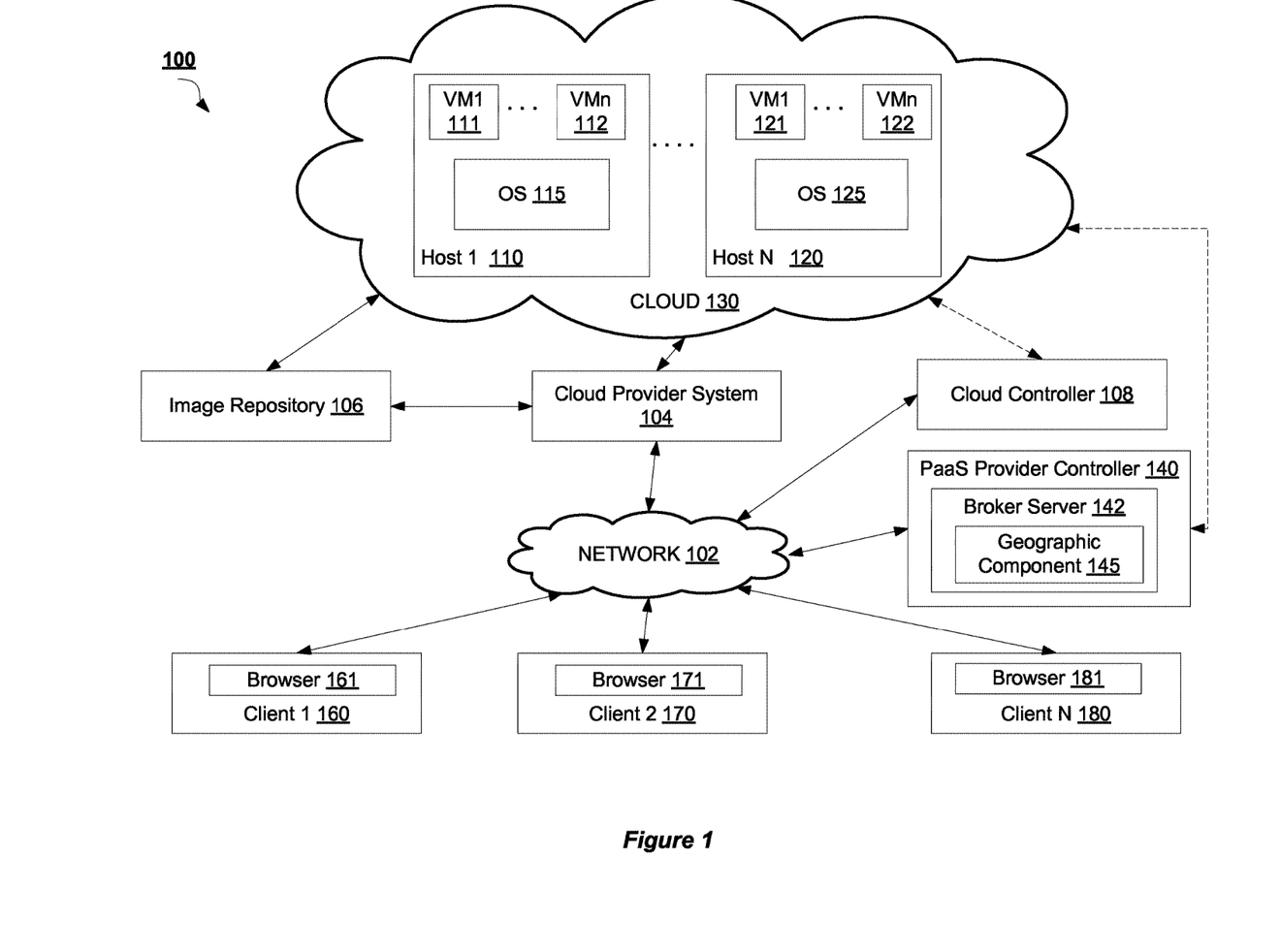
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data is used for the execution of applications for a multi-tenant PaaS system managed by the PaaS provider controller 140.

In one implementation, the PaaS provider controller 140 includes a broker server 142 with a geographic component 145. The broker server 142 utilizes its geographic component 145 to provide a way for the broker server 142 to manage placement of nodes (e.g., VMs 111, 112, 121, 122) to host deployed applications of the PaaS over several distinct geographies. A user of the PaaS may specifically request placement of a deployed (or deploying) application in a particular geography provided by the PaaS. The geographies may be different countries, regions, states, cities, datacenters, and so on. In some implementations, the geographies may also include logical separations within a data center, such as different racks or different servers.

The broker server 142 communicates with multiple messaging servers (not shown), where there is at least one dedicated messaging server for each geographic region managed by the PaaS. The dedicated messaging server server for a geographic region coordinates the deployment of the application components onto the nodes of the messaging server's particular geographic region. Further details of providing support for geographic placement of application component by a multi-tenant PaaS are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
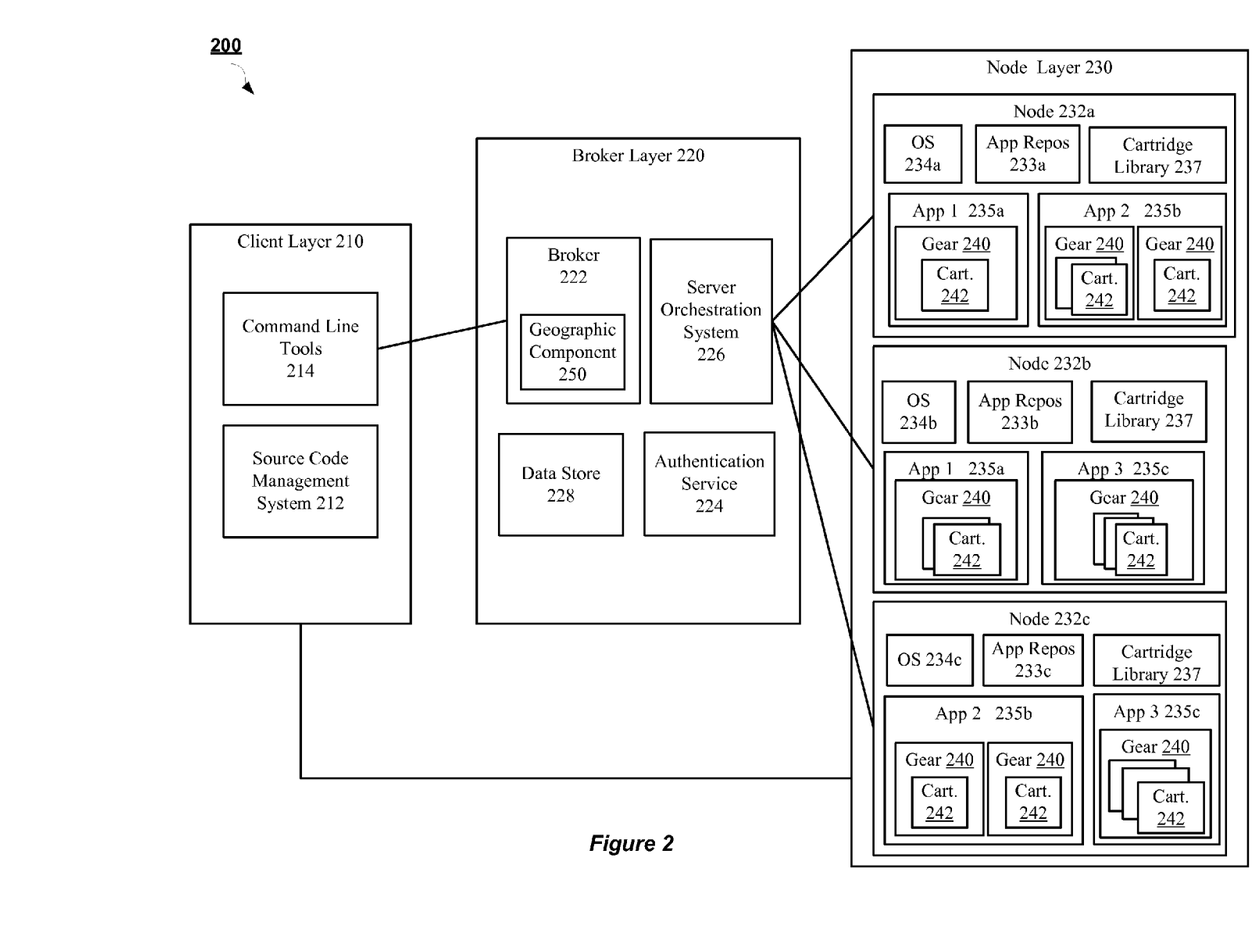
FIG. 2 is a block diagram of a PaaS system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 make use of an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure-as-a-Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command line tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client command line tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10 gen-mms-agent, cron scheduler, and HAProxy, for example. Adding an instance of a cartridge from cartridge library 237 to an application 235a-c provides a capability for the application 235a-c, without the customer who owns the application having to administer or update the included capability.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

Implementations of the disclosure provide support for geographic placement of application 235a-c components, such as gears 240 and cartridges 242, by the multi-tenant PaaS. In one implementation, broker layer 220 includes a geographic component 250 to provide support for the geographic placement of application 235a-c components in the multi-tenant PaaS 200. In one implementation, geographic component 250 is part of broker 222. The geographic component 250 may be the same as geographic component 145 described with respect to FIG. 1.

The broker 222 utilizes its geographic component 250 to assist in placement of nodes 232a-c and/or application components (of deployed or deploying applications 235a-c) at nodes 232a-c of the PaaS over several distinct geographies. A user of the PaaS may specifically request placement of a deployed (or deploying) application in a particular geography provided by the PaaS. The geographies refer to the location of the architecture that is executing the nodes 232a-c at the node layer 230. A geography, or geographic region, may include, but is not limited to, different countries, regions, states, cities, datacenters, and so on.

Figure 3:
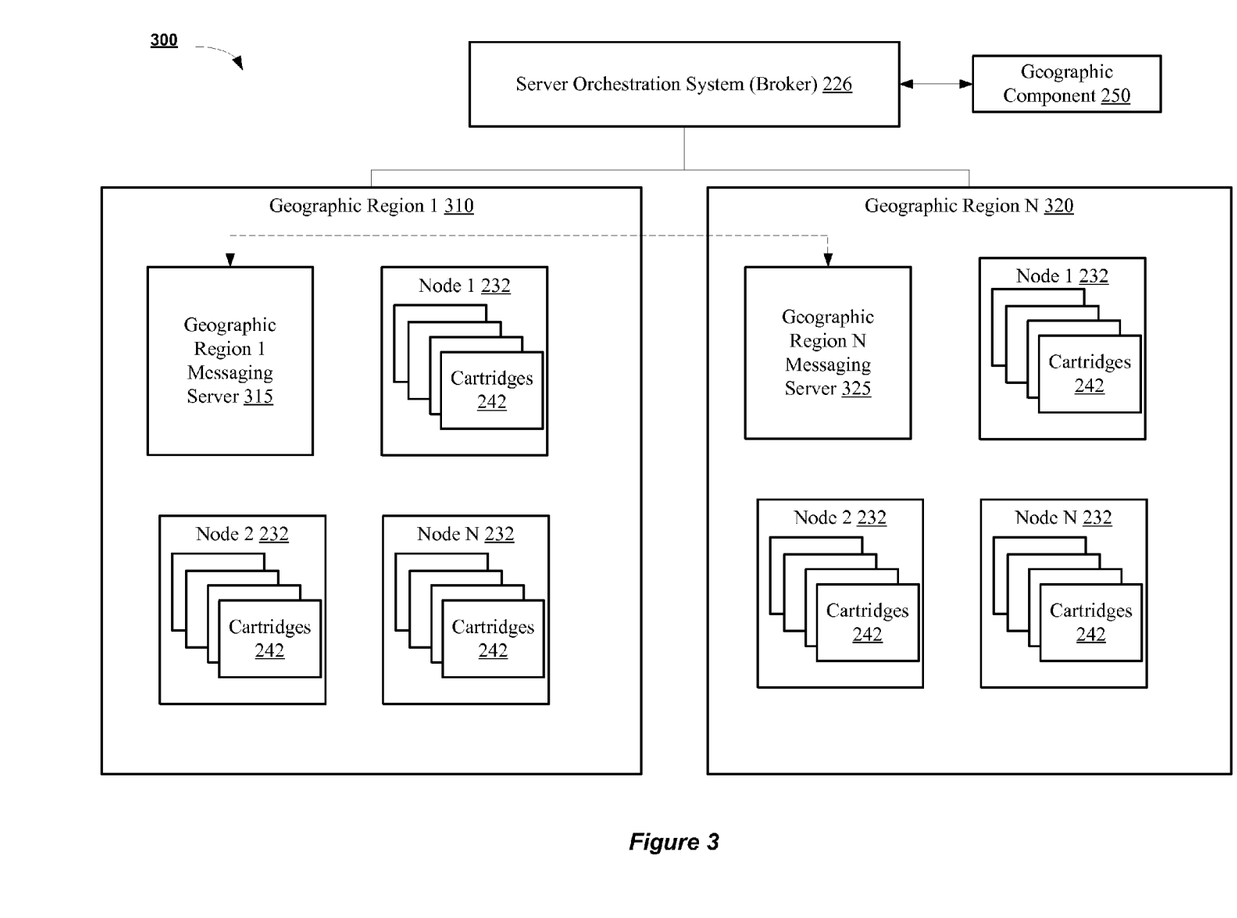
FIG. 3 is a block diagram of a communication architecture of a multi-tenant PaaS for providing geographic placement of application components according to an implementation of the disclosure.

In one implementation, the broker 222 communicates, via server orchestration system 226, with multiple messaging servers. FIG. 3 is a block diagram illustrating a communication architecture 300 of a multi-tenant PaaS for providing geographic placement of application components. Architecture 300 includes the server orchestration system 226 of the PaaS broker in communication with multiple geographic regions 210, 320. As illustrated, there may be at least one dedicated messaging server 315, 325 for each geographic region 310, 320 managed by the PaaS. The dedicated messaging server 315, 325 for a geographic region coordinates the deployment of the application components, such as cartridges 242 and gears 240 (not shown), onto the nodes 232 of the messaging server's 315, 325 particular geographic region 310, 320. The geographic component 250 of the broker is aware of each geographic region 310, 320 maintained by the PaaS. In some implementations, the geographic component 250 is also aware of the messaging servers 315, 325 for each geographic region 310, 320.

Referring to both FIGS. 2 and 3, users of the multi-tenant PaaS may specify to the broker 222, via the command line tools 214 of client layer 210, what geographic region 310, 320 to use for the user's application deployment. If a user does not specify a particular geographic region 310, 320, then the broker 222 may select a default geographic region 310, 320 for placement. The default geographic region may be pre-configured by an administrator of the multi-tenant PaaS.

In some implementations, the broker 222 identifies (utilizing geographic component 250) and communicates with the messaging server 315, 325 of the requested geographic region 310, 320. This may be considered a spoke-and-hub networking arrangement. In other implementations, the broker 222 may communicate with any of the messaging servers 315, 325, which in turn, direct the broker's 222 request to the dedicated messaging server 315, 325 of the requested geographic region 310, 320. In this case, the messaging servers 315, 325 are connected to each other and can communicated with one another. This may be considered a star topology networking arrangement. As discussed above, the messaging server 315, 325 for a geographic region 310, 320 coordinates and implements that request from the broker for the application deployment.

In some implementations, each geographic region 310, 320 may have a dedicated namespace corresponding to the region 310, 320. For example, the namespace may be a Domain Name Server (DNS) namespace for each location 310, 320. This may help direct communications to instances of an application deployment running in a particular geographic region 310, 320.

As a result, a user of the multi-tenant PaaS platform is provided additional features and has more control over where to spin up components, such as gears, of their applications, according to the user's particular needs. In some implementations, this feature may be beneficial for addressing varying demand for an application in particular locations at particular times. In other implementations, this feature is beneficial for disaster recovery purposes (e.g., by creating several versions of an application executing in different geographies). In further implementations, this feature is beneficial for logically separating environments of application developments, such as staging versus production environments.

Figure 4:
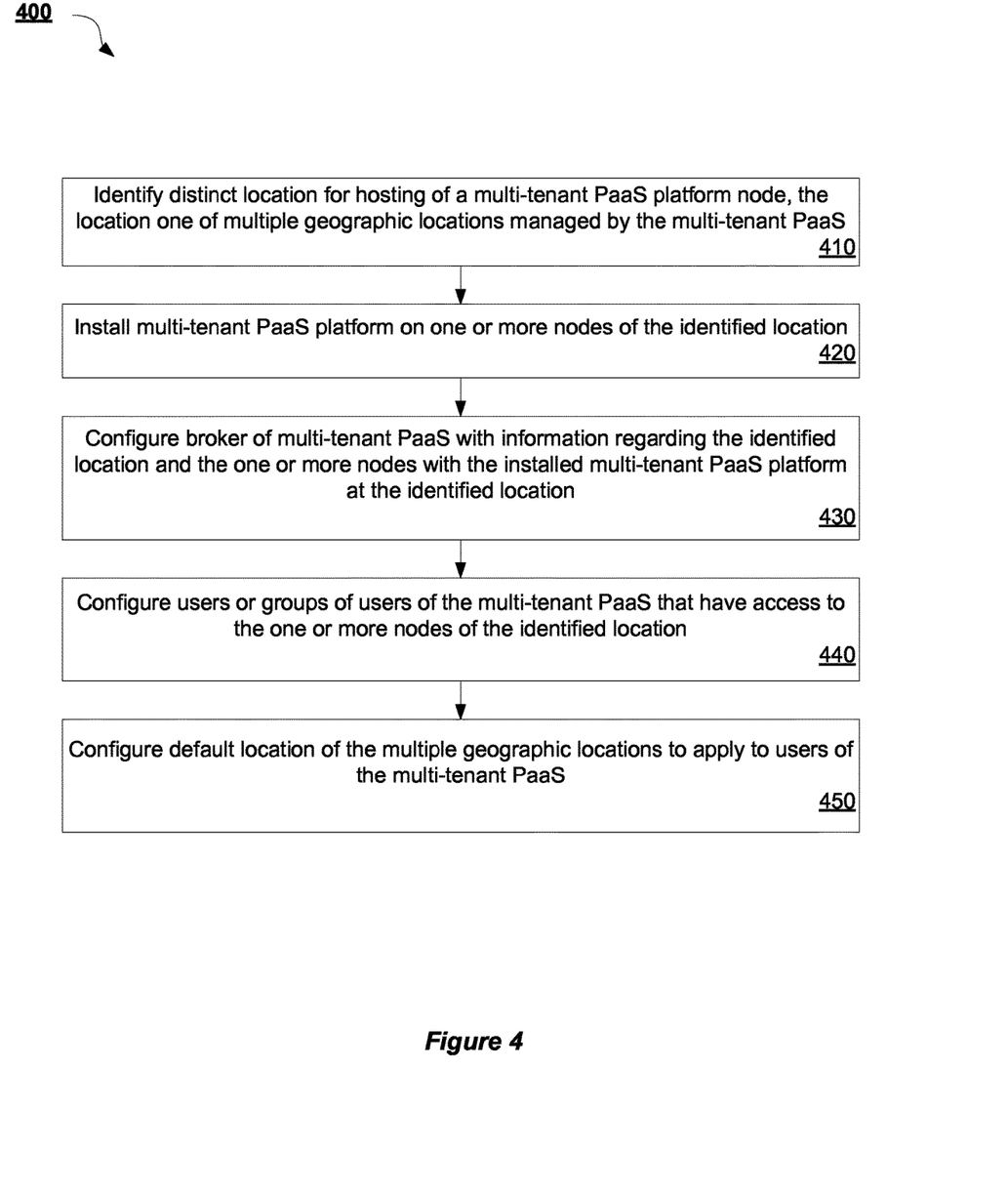
FIG. 4 is a flow diagram illustrating a method for establishing a geographic location in a multi-tenant PaaS system according to an implementation of the disclosure.

FIG. 4 is a flow diagram illustrating a method 400 for establishing a geographic location in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by broker layer 220 described with respect to FIG. 2.

Method 400 begins at block 410, where a distinct location is identified for hosting of a multi-tenant PaaS platform node. In one implementation, the location one of multiple geographic locations managed by the multi-tenant PaaS. The location may be identified by a system administrator or operator of the multi-tenant PaaS working at the broker layer 220 of the multi-tenant PaaS. At block 420, the multi-tenant PaaS platform is installed on one or more nodes of the identified location.

Then, at block 430, the broker of multi-tenant PaaS is configured with information regarding the identified location. IN addition, the broker is further configured with information regarding the one or more nodes with the installed multi-tenant PaaS platform at the identified location. At block 440, the broker configures access to the identified location for users or groups of users of the multi-tenant PaaS. Some users of the multi-tenant PaaS may have access to the identified location, while other users may not. Lastly, at block 450, a default location from the multiple geographic locations is selected and configured at the broker. This default location may apply to users of the multi-tenant PaaS that do not specifically identify a geographic location for application deployment purposes.

Figure 5:
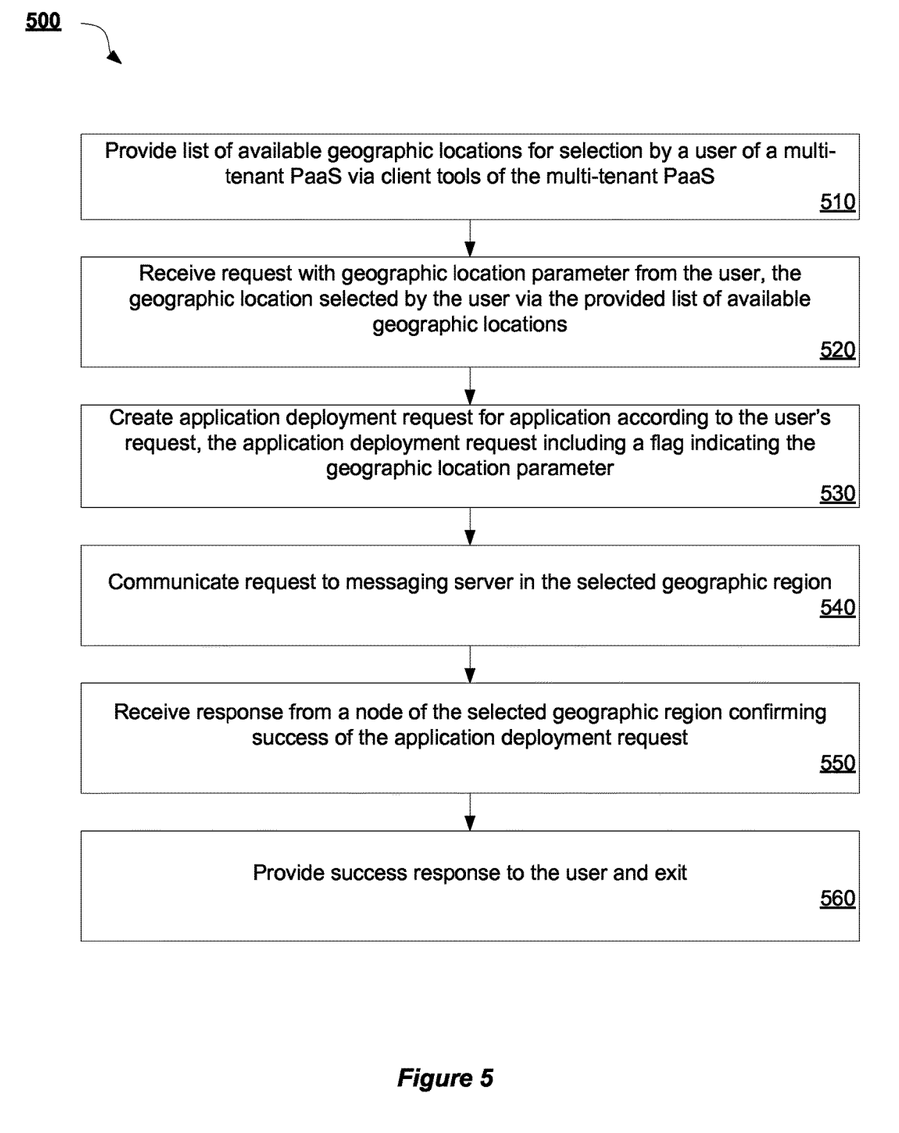
FIG. 5 is a flow diagram illustrating a method for deploying application components at a user-selected geographic location of a multi-tenant PaaS system according to an implementation of the disclosure.

FIG. 5 is a flow diagram illustrating a method 500 for deploying application components at a user-selected geographic location of a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by broker 222 described with respect to FIG. 2.

Method 500 begins at block 510, where list of available geographic locations is provided for selection by a user of a multi-tenant PaaS. In implementation, the list of locations and the selection of one of those locations occurs via client tools of the multi-tenant PaaS. The client tools may comprise command line tools and/or UI tools. At block 520, a request is received from the user with a geographic location parameter. In one implementation, the request may be to deploy one or more components (e.g., gear, cartridge, etc.) of an application of the user on the multi-tenant PaaS platform. The geographic location selected by the user may be one of the locations provided via the list of available geographic locations.

Subsequently, at block 530, an application deployment request is created for the user's application according to the user's request. The application deployment request may include a flag indicating the geographic location parameter. Then, at block 540, the application deployment request is communicated to a messaging server in the selected geographic region. In one implementation, the broker is aware of and may communicate directly with the messaging server of the geographic location. In other implementations, the broker sends out the request via a messaging layer of all of the messaging servers, and the messaging servers then communicate amongst themselves to determine the target messaging server that should handle the request (i.e., the dedicated messaging server for the request geographic region).

The dedicated messaging server for the geographic region may handle and complete the request for the user at one or more nodes within the requested geographic region. Then, at block 550, the broker receives a response from a node of the selected geographic region confirming success of the application deployment request. The node sending the success response may be the node in the geographic region that the application components the user requested were deployed. Lastly, at block 560, the broker provides the success response to the user and exits the request process with the user. At this point, the user continues to directly communicate with the node hosting the application components.

Figure 6:
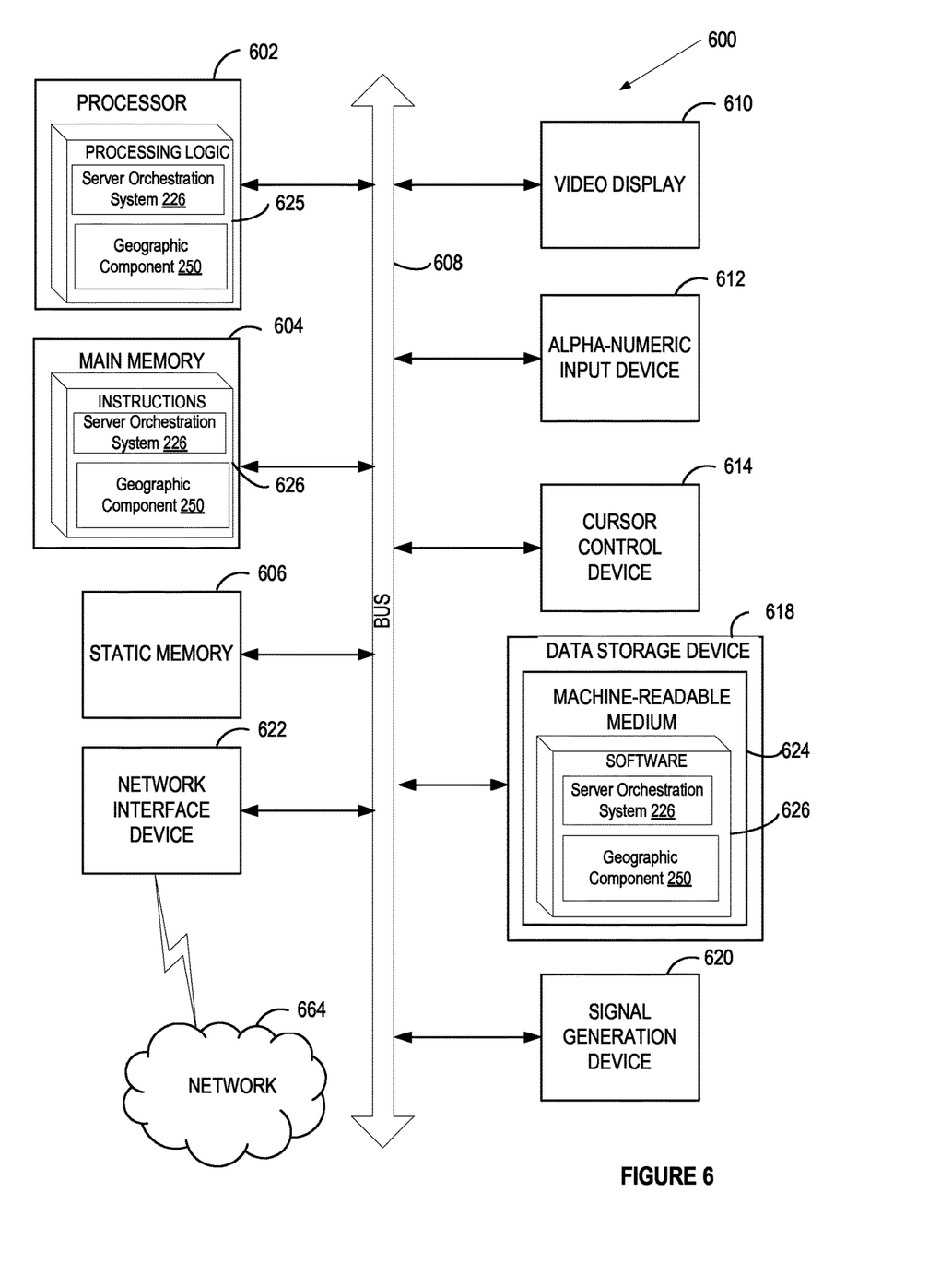
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a server orchestration system 226 and a geographic component 260 to implement geographic placement of application components in a multi-tenant PaaS, such as the server orchestration system 226 and geographic component 260 described with respect to FIG. 2, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
providing, by a processing device of a multi-tenant Platform-a-a-Service (PaaS) system in communication with a plurality of messaging servers where each messaging server corresponds to a distinct geographic location, a list of available geographic locations, wherein each of the geographic locations corresponds to at least one node that is associated with at least one component of an application, and wherein the at least one component of the application specifies a resource limit to a process space of the at least one node that is associated with the at least one component of the application, and wherein the processes space is unique to the application and to the at least one node;
receiving, by the processing device, a first request to deploy the at least one component of the application, the first request comprising a selection of one of the available geographic locations from the list; and
communicating, by the processing device, a second request to deploy the at least one component of the application in view of the resource limit to the process space, the second request directed to a messaging server corresponding to the selected geographic location, the corresponding messaging server of the selected geographic location to handle a configuration of the at least one node in the selected geographic location for the at least one component of the application in view of a communication with another messaging server corresponding to another geographic location.

2. The method of claim 1, wherein the communicating further comprises sending the second request directly to the corresponding messaging server for the selected geographic location.

3. The method of claim 1, further comprising:
receiving a success response from the at least one node confirming deployment of the at least one component of the application; and
communicating the success response to a user.

4. The method of claim 1, wherein the at least one node is a virtual machine deployed in a server machine in the selected geographic location.

5. The method of claim 1, wherein the at least one component comprises a gear from the application.

6. The method of claim 1, wherein the at least one component comprises a cartridge for the application.

7. The method of claim 1, further comprising when the first request does not comprise a selection of one of the geographic locations from the list, indicating a default geographic location in the second request.

8. A system, comprising:
a memory; and
a processing device, operatively coupled with the memory, to:
provide a list of available geographic locations associated with a multi-tenant Platform-as-a-Service (PaaS) system in communication with a plurality of messaging servers where each messaging server corresponds to a distinct geographic location, wherein each of the geographic locations corresponds to at least one node associated with at least one component of an application, and wherein the at least one component of the application specifies a resource limit to a process space of the at least one node that is associated with the at least one component of the application, and wherein the processes space is unique to the application and to the at least one node;
receive a first request to deploy the at least one component of the application, the first request comprising a selection of one of the available geographic locations from the list; and
communicate a second request to deploy the at least one component of the application in view of the resource limit to the process space, the second request directed to a messaging server corresponding to the selected geographic location, the corresponding messaging server of the selected geographic location to handle a configuration of the at least one node in the selected geographic location for the at least one component of the application in view of a communication with another messaging server corresponding to another geographic location.

9. The system of claim 8, wherein to communicate, the processing device is to send the second request directly to the corresponding messaging server for the selected geographic location.

10. The system of claim 8, wherein the processing device further to:
receive a success response from the at least one node confirming deployment of the at least one component of the application; and
communicate the success response to a user.

11. The system of claim 8, wherein the at least one node is a virtual machine deployed in a server machine in the selected geographic location.

12. The system of claim 8, wherein the at least one component comprises at least one of a gear for the application or a cartridge for the application.

13. The system of claim 8, wherein the processing device further to:
indicate a default geographic location in the second request when the first request does not comprise a selection of one of the available geographic locations from the list.

14. A non-transitory machine-readable storage medium comprising instructions that, when accessed by a processing device, cause the processing device to:
provide, by the processing device of a multi-tenant Platform-as-a-Service (PaaS) system, a list of geographic locations, the multi-tenant PaaS system being in communication with a plurality of messaging servers where each messaging server corresponds to a distinct geographic location, wherein each of the geographic locations corresponds to at least one node associated with at least one component of an application, and wherein the at least one component of the application specifies a resource limit to a process space of the at least one node that is associated with the at least one component of the application, and wherein the processes space is unique to the application and to the at least one node;
receive, by the processing device, a first request to deploy the at least one component of the application, the first request comprising a selection of one of the available geographic locations from the list; and
communicate, by the processing device, a second request to deploy the at least one component of the application in view of the resource limit to the process space, the second request directed to a messaging server corresponding to the selected geographic location, the corresponding messaging server of the selected geographic location to handle a configuration of the at least one node in the selected geographic location for the at least one component of the application in view of a communication with another messaging server corresponding to another geographic location.

15. The non-transitory machine-readable storage medium of claim 14, wherein to communicate, the processing device is to send the second request directly to the corresponding messaging server for the selected geographic location.

16. The non-transitory machine-readable storage medium of claim 14, further to:
receive a success response from the at least one node confirming deployment of the at least one component of the application; and
communicate the success response to a user.

17. The non-transitory machine-readable storage medium of claim 14, further to:
indicate a default geographic location in the second request when the first request does not comprise a selection of one of the available geographic locations from the list.

* * * * *